No. 694,935. Patented Mar. 11, 1902.
T. C. BAKER.
AUTOMATIC WEIGHING MACHINE.
(Application filed Jan. 8, 1901.)
(No Model.) 3 Sheets—Sheet 1.
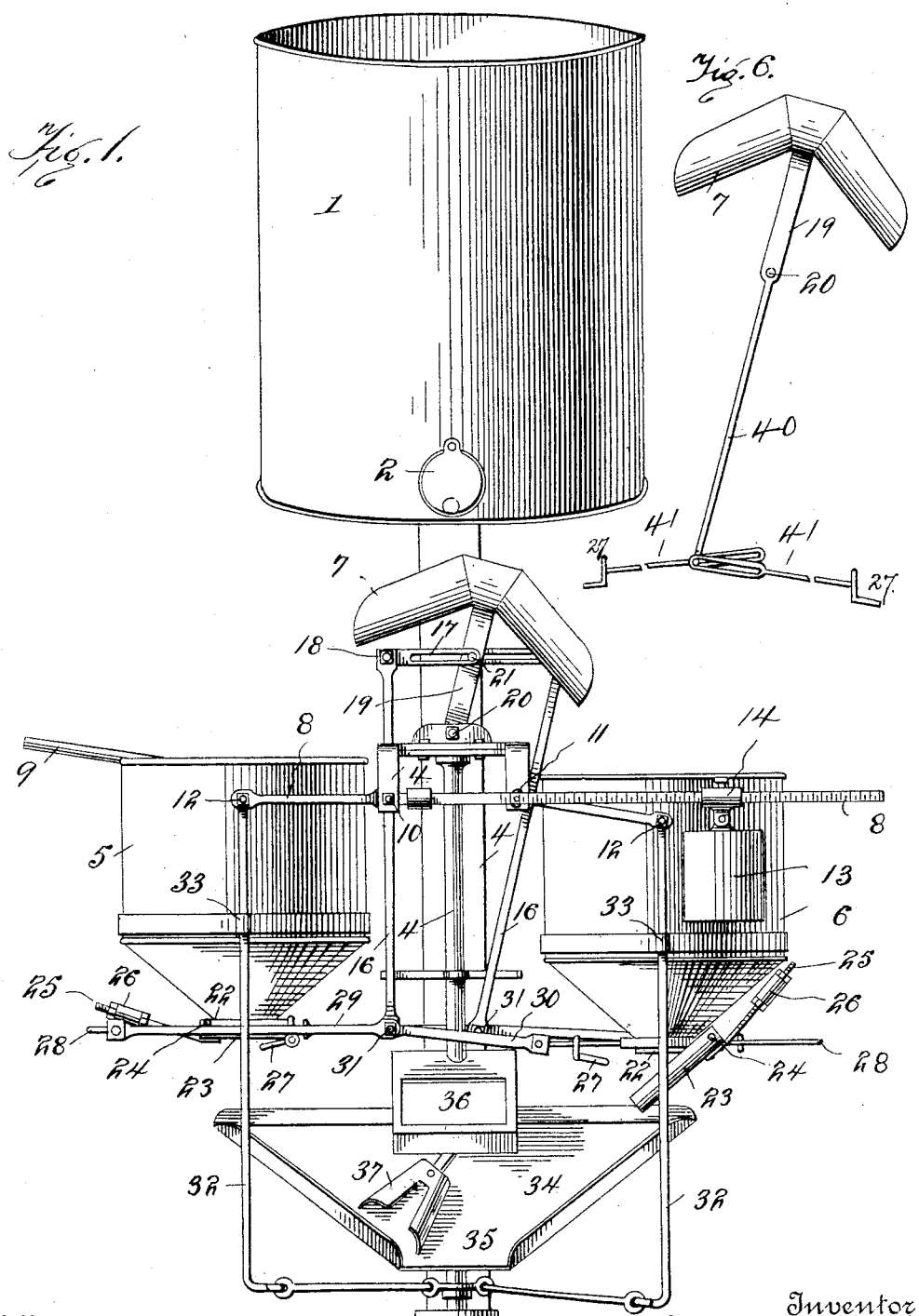
Witnesses
Chas. K. Davies
C. H. Hartman
Inventor
Thomas C. Baker
by Fenelon D. Brock
Attorney No. 694,935. Patented Mar. 11, 1902.
T. C. BAKER.
AUTOMATIC WEIGHING MACHINE.
(Application filed Jan. 8, 1901.)
(No Model.) 3 Sheets—Sheet 2.
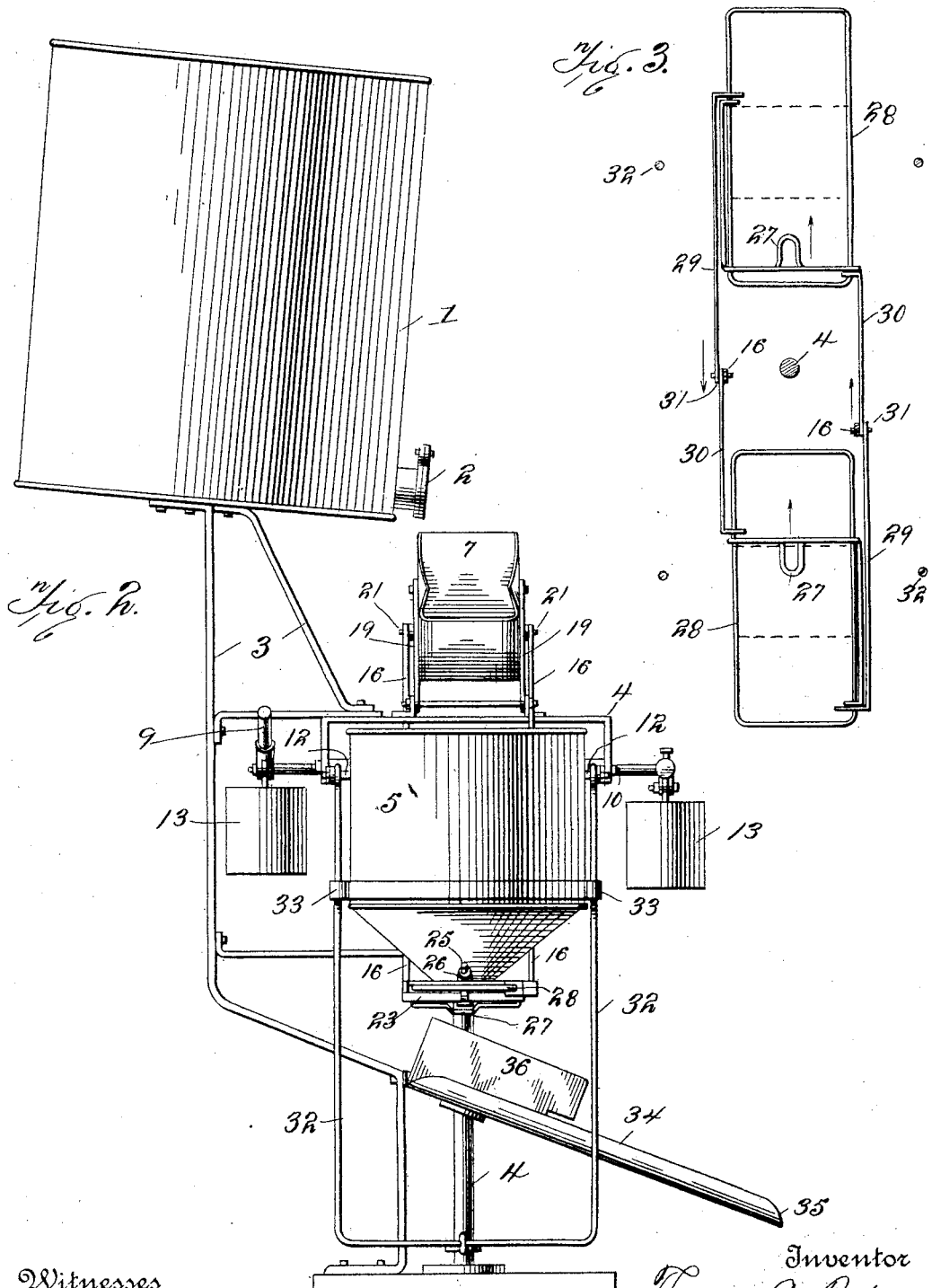
Witnesses
Chas. K. Davies.
Inventor
Thomas C. Baker
by Fenelon B. Brock
Attorney No. 694,935. Patented Mar. 11, 1902.
T. C. BAKER.
AUTOMATIC WEIGHING MACHINE.
(Application filed Jan. 8, 1901.)
(No Model.)
3 Sheets—Sheet 3.

Witnesses
Chas K. Davis.

Inventor
Thomas C. Baker
by Fenelon B. Brock
Attorney

UNITED STATES PATENT OFFICE.

THOMAS C. BAKER, OF WASHINGTON, KANSAS.

AUTOMATIC WEIGHING-MACHINE.

SPECIFICATION forming part of Letters Patent No. 694,935, dated March 11, 1902.

Application filed January 8, 1901. Serial No. 42,526. (No model.)

*To all whom it may concern:*

Be it known that I, THOMAS C. BAKER, of the city of Washington, county of Washington, State of Kansas, have invented certain new and useful Improvements in Automatic Weighing-Machines; and I do hereby declare that the following is a full and clear description thereof.

My invention relates to weighing-machines.

The object of my present improvements contemplates the automatic weighing of grain as it falls from an elevator or other superposed storage, whereby the grain is allowed to flow continuously through my automatic weighing-machine. As it passes through the machine it is automatically weighed in a series of predetermined quantities or weights, of which due register or tally is kept, and said separated quantities delivered into bags, barrels, or other packages in which it is desired to put up the grain for market.

While I will describe my invention as capable of weighing any material, whether it is a comminuted material or a liquid, I contemplate and do hereby claim its use for the weighing of all substances of which my invention may be found suitable.

With these objects in view my invention consists in the following construction and combination of parts, the details of which will first be fully described and the features of novelty thereafter set forth and claimed.

Figure 4:
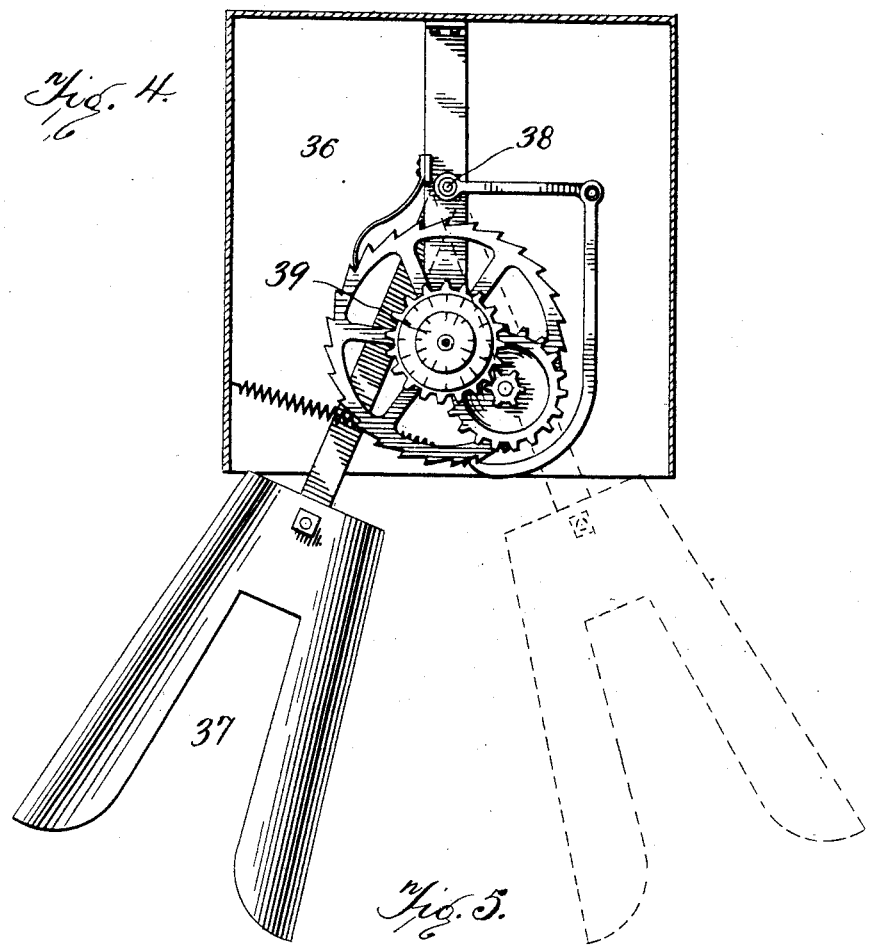
Figure 5:
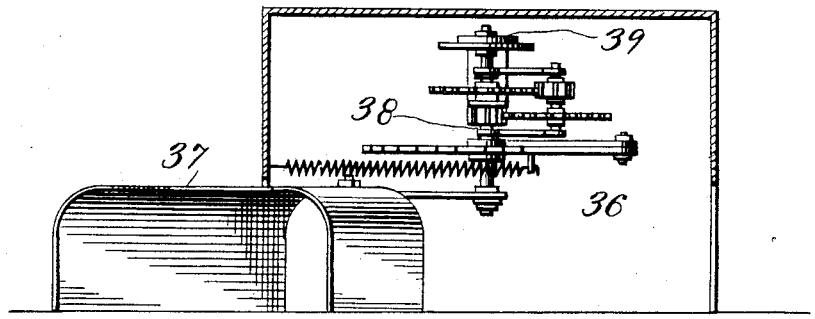

In the drawings, Figure 1 represents a front elevation of the weighing-machine to which my improvements have been applied. Fig. 2 is an end elevation of the same. Fig. 3 is a detail plan, partly in section, of portions of the throat-latching mechanism. Fig. 4 is a detail view, on an enlarged scale, partly in section, of the registering apparatus; and Fig. 5 represents a similar view, but in vertical elevation, of the registering apparatus. Fig. 6 is a detail view of the hand-operating mechanism hereinafter referred to.

1 is a hopper or storage-tank located above the weighing-machine and having a spout or gate 2, through which the grain flows by gravity to the weigher below. This tank 1 may typify the storage compartment or compartments of any grain-elevator. In the present instance I have shown, merely for purposes of exemplification, a framework 3 upon the frame of the weighing-machine for supporting the hopper 1.

4 represents any suitable frame for supporting the operating parts of the weigher and in this instance the hopper 1.

5 and 6 represent pivoted hoppers which receive grain alternately from the pivoted conveyer 7, located above the hoppers.

8 and 9 are scale-beams pivoted at 10 and 11 to the frame 4, one end of each scale-beam being bifurcated to receive the hoppers, to which the latter are pivoted at 12, and the other end of the scale-beam 8 being provided with graduations to receive the counterpoise weights 13.

14 represents sleeves secured to the weights 13 and to the graduated scale and provided with set-screws by means of which the weights are adjusted upon the beams at any desired point and locked thereto. Counterpoise-weights may be provided for the purpose of suitably counterbalancing the scale-beams when the weights 13 are at zero on the graduated scale-arms.

16 represents vertically-disposed arms, one rigidly attached to each of the scale-beams 8 and 9.

17 represents slotted connecting-links pivotally connected to the upper ends of the arm 16 at 18 and also to the pivoted arm or arms 19, which support the upper conveyer 7.

20 represents the pivots of oscillating arm 19, supported upon the framework 4.

21 represents the pivots which secure the inner ends of the link 17 and which also permit said slotted links to have a sliding movement upon said pivots 21.

The conveyer 7 is provided with two chutes and is adapted to alternately deliver grain into both hoppers 5 and 6.

22 represents the throats of the hoppers, located at their lower ends, the bottom of the hoppers being preferably of conical shape, as shown.

23 represents the gates or valves which are adapted to control the discharge of the grain through the throats of the hoppers. They are pivoted at 24 at one side of the throats and provided with counterbalancing arms 25, having adjustable counterpoise-weights 26 thereon. These weights 26 are set so that when there is no grain in the hoppers said weights will act to swing the gates 23 up against the throats of the hoppers in a horizontal position.

27 represents the throat-latches, one for each gate 23.

28 represents rectangular framework rigidly secured to the throat of the hoppers in any suitable way and in a horizontal position. The latches 27 are secured to the frames 28, so as to have a reciprocating movement thereon, whereby the latch may be disengaged from the gates 23 or thrown into contact therewith.

At the lower ends of the vertical arms 16, rigidly connected to the scale-beams 8 and 9, are link-bars 29 and 30, pivoted at their inner ends at 31. The outer ends of links 30 have a sliding pivotal movement upon the frames 28, and the outer ends of links 31 have a sliding pivotal connection with the frame 28, the former set of levers acting to throw the latches 27 into engagement with the gates 23 and the latter levers operating to withdraw the latches from engagement with the gates.

32 represents frames or harness secured to the scale-beams or hoppers at their upper ends and to the frame 4 at their lower ends by means of links or pivotal connections. The harness 32 are also preferably secured to the hoppers at 33, the purpose of the harness being to maintain the vertical position of the hoppers in their oscillating movement.

34 is an inclined chute or apron having a contracted delivery-spout 35. This apron receives the alternate discharge of the hoppers through their throats and conveys the grain therefrom to a common point for the purpose of bagging or packaging the same.

36 is the registering apparatus, carried in a box or compartment.

37 is a wing or tail carried upon an arm pivoted at 38, which wing is adapted to be vibrated back and forth upon the chute 34 by the impact of the grain flowing against the same.

39 represents registering dials or hands operating by the vibratory movement of the wing 37 for the purpose of keeping tally of the number of discharges made by the hoppers 5 and 6. The tally mechanism consists of a series of wheels, ratchets, and pawls, which act to intermittently move the registering dials or hands through the vibration of the wing. The registering or tally mechanism moves step by step only upon each alternate vibration of the wing 37. The number of discharges are calculated either by multiplying the number of step-by-step movements by two or by arranging the dial with an arithmetical progression of numerals divisible by two.

The operation is as follows: When the gate 2 is opened, the grain flows through the gate by gravity and falls upon the conveyer 7. In Fig. 1 the chute is tilted to the right and the grain falls upon the left-hand portion of the chute and is deflected into the hopper 5. This hopper has its scale-beam previously weighted, so that the hopper will descend when a given number of bushels or pounds of grain fall therein. The latch 27 is in engagement with the gate 23 of the hopper-throat, so that the grain which falls in the hopper is retained therein. When the weight of the grain preponderates the set weight of the scale of this hopper, the latter descends or falls within a limited range, thereby moving the arm 16 to the right and the link 29 in engagement with the latch 27, thereby releasing the latch, whereupon the weight of the grain opens the gate 23. The grain is thereby deflected into the chute 24, and it impinges against the wing or tail 37, causing the latter to be vibrated to the right, which movement, through the registering apparatus, causes the dial to record the same. At the same time the upper end of the arm 16 moves the link 17 to the left and vibrates the chute 7 in the same direction, whereby the continuous flow of the grain through the gate 2 is deflected into the right-hand portion of said chute 7, causing the hopper 6 to be filled with grain. After the grain has been discharged from hopper 5 the weight 26 acts to swing the gate 23 thereof upwardly into position to be again engaged by the latch 27. When grain has passed into hopper 6 sufficient to overcome the weight of its scale-beam, the hopper descends, and the lower end of its arm 16 is swung to the left, thereby withdrawing its latch 27 from its gate 23, and at the same time its link 29 is moved to the left, thereby latching the throat-gate of the left-hand hopper 5 to receive a succeeding quantity of grain. The discharge from the right-hand hopper 6 being deflected into the chute 34 flows against the wing 37, vibrating said wing again to the left, and thereby recording on the tally the discharge from that hopper. The alternate filling, discharging, and registering from both hoppers is thereby continuous and automatic so long as the grain continues to flow through the gate 2 of the elevated bin 1.

For the purpose of shifting the conveyer 7 by hand an arm 40 is provided, which may be rigid with the arm 19 and have links 41 connected therewith and to the throat-latches 27, as seen in Fig. 6, so that when the conveyer 7 is reversed by hand it will latch the throat-gate of the hopper into which the grain is being delivered and unlatch the opposite throat-latch.

While I have shown in the drawings accompanying this specification specific mechanism for carrying out my invention, I wish it understood that I do not limit myself to the specific details hereinbefore enumerated, my invention being intended to cover all equivalent devices of this character which come within the scope of my claims.

What I claim as new, and desire to secure by Letters Patent, is—

1. The combination of a frame, scale-beams mounted thereon, pivoted hoppers carried thereby, gates for the hoppers, latches for the gates, an inverted-V-shaped pivoted conveyer located over the hoppers, and link connections between the conveyer, and the scale-beams and link connections between the scale-beams and the gate-latches, whereby the movement of the scale-beams alternately moves said conveyer and gate-latch.

2. The combination of a frame, scale-beams mounted thereon, pivoted hoppers carried thereby, gates for the hoppers, latches for the gates, a movable conveyer having chutes located over the hoppers, link connections between the conveyer, and the scale-beams and link connections between the scale-beams and the gate-latches, a chute, below the hoppers, and a vibrating wing in said chute, a registering mechanism and connections between the wing and register for registering each alternate vibration of the wing, whereby the movement of the scale-beams alternately moves the conveyer and gate-latches and the wing registers the discharge from the hoppers.

3. The combination of a frame, scale-beams mounted thereon, pivoted hoppers carried thereby, gates for the hoppers, latches for the gates, and a pivoted inverted-V-shaped vibrating conveyer having chutes located over the hoppers and link connections between the conveyer, and the scale-beams and link connections between the scale-beams and the gate-latches.

4. The combination of a frame, a pivoted inverted-V-shaped vibrating conveyer having a double chute oscillating in said frame, and a plurality of scale-beams having pivoted hoppers mounted thereon.

5. The combination of a frame, scale-beams having hoppers thereon mounted in said frame, a discharge-chute below said hoppers adapted to receive the discharge of both hoppers, a vibrating wing pivoted in and movable across said chute adapted to be alternately oscillated by the impact of the material upon the opposite sides of the wing, and a registering mechanism connected with said wing.

6. The combination of a frame, scale-beams mounted thereon, separately-movable pivoted hoppers carried thereby, an inverted-V-shaped pivoted conveyer above the hoppers, connections between the conveyer and the scale-beams, gates carried by said hoppers, latches for the gates, and mechanism for unlatching the gate of one hopper at a predetermined weight and simultaneously latching the gate of the other hoppers.

7. The combination of a frame, scale-beams mounted upon said frame, hoppers mounted in the scale-beams provided with gates and latches, an inverted-V-shaped pivoted conveyer above the hoppers, connections between the conveyer and the scale-beams, an arm carried by each scale-beam, and a link connected to each arm adapted to alternately engage and disengage the latches of the gates.

8. The combination of a frame, scale-beams mounted upon said frame, hoppers mounted in the scale-beams provided with gates and latches, an arm carried by each scale-beam, a link connected to each arm for actuating the hopper-latches a pivoted vibrating conveyer located above the hoppers, and connections between the scale-beams and the conveyer for vibrating the latter upon the descent of either hopper.

9. The combination of a frame, scale-beams mounted in said frame, pivoted hoppers mounted in said scale-beams, gates for the hoppers, latches for the gates, connections between the scale-beams and the gate-latches for alternately latching and unlatching the gates, a pivoted conveyer located above the hoppers, an arm projecting from each scale-beam, and a link connecting each arm to the pivoted conveyer.

10. The combination of a frame, pivoted scale-beams mounted in said frame, a pivoted vibrating conveyer located above the scale-beams, an arm projecting from each scale-beam, bearings upon the vibrating conveyer, and slotted links connecting the arms of the scale with the conveyer for alternately vibrating the latter.

11. The combination of a frame, scale-beams mounted thereon, hoppers pivoted in the scale-beams, gates pivoted to the hoppers, a latch-frame secured to the lower end of the hoppers, latches movable upon the latch-frame, and connections between the scale-beams and the latches alternately reciprocating the same.

12. In a weighing-machine the combination of a chute carrying a contracted outlet, a wing in said chute to vibrate across the mouth of said outlet by the alternate discharge against the opposite sides of the wing, and registering mechanism connected with said wing for registering the number of its vibrations or oscillations.

13. In a weighing-machine the combination of a chute, a vibrating or oscillating wing located in said chute adapted to be alternately oscillated by the impact of the grain upon opposite sides of the wing and registering mechanism connecting with said wing.

14. In a weighing-machine a vibrating wing adapted to be alternately oscillated in opposite directions by the discharge of grain in impact therewith and registering mechanism connected with said wing.

In testimony whereof I have affixed my signature in presence of two witnesses.

THOMAS C. BAKER.

Witnesses:
MARVIN A. ROOT,
D. F. PERKINS.